United States Patent
Park

(10) Patent No.: US 7,031,098 B2
(45) Date of Patent: Apr. 18, 2006

(54) METHOD OF MEASURING COMPENSATION VALUE FOR SHORT TRACK SEEKING IN HARD DISC DRIVE AND METHOD OF COMPENSATING FOR BIAS USING THE SAME

(75) Inventor: Cheol-hoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/936,643

(22) Filed: Sep. 9, 2004

(65) Prior Publication Data

US 2005/0105207 A1    May 19, 2005

(30) Foreign Application Priority Data

Sep. 20, 2003    (KR) ............. 10-2003-0065415

(51) Int. Cl.
*G11B 5/596*    (2006.01)
(52) U.S. Cl. .................................. 360/78.04
(58) Field of Classification Search ............ None
See application file for complete search history.

(56) References Cited

U.S. PATENT DOCUMENTS

| | | | | |
|---|---|---|---|---|
| 4,949,202 A | * | 8/1990 | Kim ................... | 360/78.14 |
| 5,227,930 A | * | 7/1993 | Thanos et al. ......... | 360/78.04 |
| 5,719,719 A | * | 2/1998 | Tsuyoshi et al. ........ | 360/66 |
| 5,773,948 A | * | 6/1998 | Kim et al. ............. | 318/561 |
| 5,912,782 A | * | 6/1999 | Lee et al. ............. | 360/78.09 |
| 5,999,361 A | * | 12/1999 | Kim .................... | 360/78.09 |

FOREIGN PATENT DOCUMENTS

KR    1998-26197    7/1998

* cited by examiner

*Primary Examiner*—K. Wong
(74) *Attorney, Agent, or Firm*—Staas & Halsey LLP

(57) ABSTRACT

A method of calculating bias compensation values for track seeking, including: setting a reference track, and search tracks disposed between the reference track and an innermost track and between the reference track and an outermost track; calculating bias compensation values usable for compensating for biases operating on a magnetic head while moving the magnetic head a direction from the reference track to one of the outermost track and to the innermost track, and then in another direction from the reference track to other of the one of the innermost track and the outermost track; and making bias compensation curves according to head moving distances using the calculated bias compensation values.

23 Claims, 8 Drawing Sheets

METHOD OF MEASURING COMPENSATION VALUE FOR SHORT TRACK SEEKING IN HARD DISC DRIVE AND METHOD OF COMPENSATING FOR BIAS USING THE SAME

CROSS-REFERENCE TO RELATED APPLICATIONS

This application claims the priority of Korean Patent Application No. 2003-65415 filed on Sep. 20, 2003 in the Korean Intellectual Property Office, the disclosure of which is incorporated herein in its entirety by reference.

BACKGROUND OF THE INVENTION

1. Field of the Invention

The present invention relates to a method of compensating for biases for effective servo control of a hard disc drive, and more particularly, to a method of measuring a bias compensation value for short track seeking of a hard disc drive and a method of compensating for a bias using the same.

2. Description of Related Art

In general, a hard disc drive, which magnetically records data or reproduces data from a rotating magnetic disc, is capable of accessing a large amount of data at a high speed. Thus, the hard disc drive has been frequently used as an auxiliary storage device of a computer system.

In the hard disc drive, data is stored in tracks formed on a disc in concentric circles. For a read/write operation, such tracks are accessed by a magnetic head. The magnetic head moves over a magnetic disc in a radial direction so that it can be positioned on a desired track, which is referred to as track seeking.

For track seeking, disturbances acting on the magnetic head are referred to as a bias. The bias varies depending on several factors, including position, moving distance, and moving direction of the magnetic head. That is, during track seeking, initial driving power of a voice coil changes according to the position and moving direction of the magnetic head, and initial moving speed of the magnetic head changes according to the moving distance of the magnetic head. Accordingly, the bias must be compensated for based on the position, moving distance, and moving direction of the magnetic head.

A value for compensating for bias effects (hereinafter referred to as a "compensation value") is measured during a bias calibration process performed when power is supplied to a hard disc drive. The measured bias compensation value is stored in a bias compensation table and used for track seeking or track following.

Conventionally, the bias compensation value is measured while moving the magnetic head in a specified direction of a disc, e.g., in an outer diameter direction, and then measured again while moving the head in another direction of the disc, e.g., in an inner diameter direction. In this case, a distance traveled by the magnetic head corresponds to 10,000 or more tracks.

Accordingly, when bias compensation curves are obtained by moving the magnetic head a long distance, e.g., moving it in the outer diameter direction or in the inner diameter direction, an offset between the bias compensation curves is very large.

It is assumed that short track seeking corresponding to less than 1000 tracks is performed while reversing direction of the track seeking. In this case, a bias caused is not large. Nevertheless, when the compensation curves for long track seeking are applied to compensate for the bias, the compensation curves cause disturbances to the magnetic head since bias compensating value is at least as large as the offset, thus increasing the time required to perform track seeking.

There has been an effort to increase the radial density of concentric data tracks in high performance hard disc drives, thus resulting in a reduction in track width. Therefore, it is very important to compensate for a bias during track seeking, not only when moving the magnetic head a large distance, e.g., 10000 tracks or more (hereinafter referred to as "long track seeking") but also when moving it a short distance, e.g., 1000 tracks or less (hereinafter referred to as "short track seeking").

BRIEF SUMMARY

The present invention provides a method of measuring a bias compensation value for effectively compensating for a bias during short track seeking.

The present invention also provides a method of compensating for bias effects operating on a magnetic head caused by a bias during a short seek.

According to an aspect of the present invention, there is provided a method of calculating bias compensation values for track, including: setting a reference track seeking, and search tracks disposed between the reference track and an innermost track and between the reference track and an outermost track; calculating bias compensation values usable for compensating for biases operating on a magnetic head while moving the magnetic head a direction from the reference track to one of the outermost track and to the innermost track, and then in another direction from the reference track to other of the one of the innermost track and the outermost track; and making bias compensation curves according to head moving distances using the calculated bias compensation values.

According to another aspect of the present invention, there is provided a method of compensating for a bias generated when performing track seeking, including: setting a reference track, and search tracks disposed within a specified range from a track between the reference track and an innermost track to a track between the reference track and an outermost track; calculating bias compensation values usable to compensate for biases operating on a magnetic head while moving the magnetic head in the direction from the reference track to one of the outermost track and the innermost track and then in the direction from the reference track to the other of one of the innermost track and the outermost track; making bias compensation curves according to head moving distances using the calculated bias compensation values; determining whether a head moving distance when performing track seeking by moving the magnetic head is within the specified range; and compensating for biases using the bias compensation curves when the head moving distance is within the specified range.

According to still another aspect of the present invention, there is provided a method of calculating bias compensation values for track seeking, including: measuring bias compensation values for short track seeking; and compensating for a bias using an appropriate compensation table selected from a plurality of compensation tables depending on whether short track seeking or long track seeking is required.

According to still another aspect of the present invention, there is provided a hard disk drive which calculates bias compensation values for track seeking, including a controller which: sets a reference track, and search tracks disposed between the reference track and an innermost track and between the reference track and an outermost track; calculates bias compensation values usable for compensating for biases operating on a magnetic head while moving the magnetic head in a direction from the reference track to one of the outermost track and to the innermost track, and then in another direction from the reference track to other of the one of the innermost track and the outermost track; and calculates bias compensation curves according to head moving distances using the calculated bias compensation values.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF INVENTION

Figure 1:
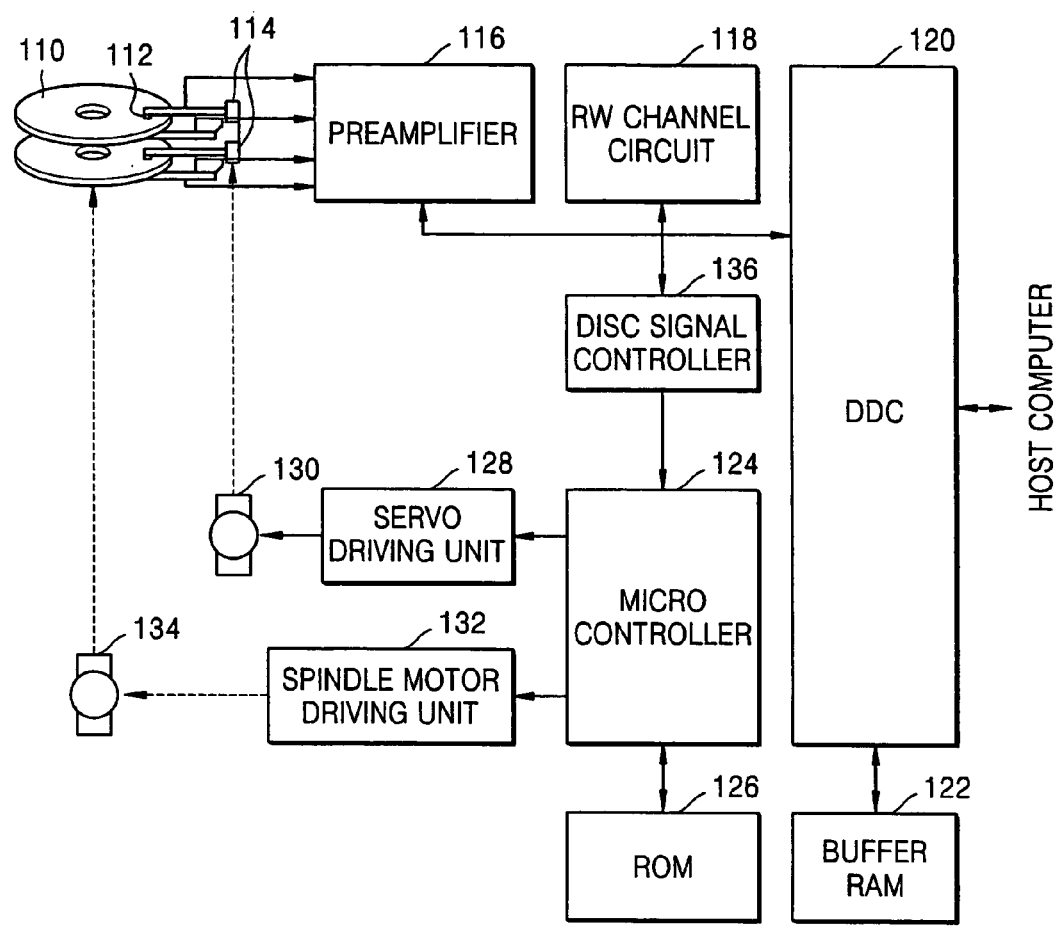
FIG. 1 is a block diagram of a conventional hard disc drive.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a conventional hard disc drive. Referring to FIG. 1, discs 110 are rotated by a spindle motor 134. Magnetic heads 112 are positioned on the corresponding discs 110 and attached to respective support arms extending from an E-block assembly 114, which is coupled with a voice coil actuator (VCA) 130. During a read operation, a preamplifier 116 pre-amplifies a signal produced by one of the heads 112 to obtain an analog read signal and transmits the analog read signal to a read/write (RW) channel circuit 118. During a write operation, the preamplifier 116 allows encoded write data input from the RW channel circuit 118 to be written to one of the discs 110 using one of the heads 112.

The RW channel circuit 118 detects a data pulse from a read signal input from the preamplifier 116, decodes it, and outputs a result of decoding to a disc data controller (DDC) 120. Also, the RW channel circuit 118 decodes write data input from the DDC 120 and outputs a result of decoding to the preamplifier 116. The DDC 120 allows data input from a host computer to be written to one of the discs 110 via the RW channel circuit 118 and the preamplifier 116. In addition, the DDC 120 interfaces communication between the host computer and a microcontroller 124. A random access memory (RAM) buffer 122 temporarily stores data exchanged between the host computer and the RW channel circuit 118 and between the RW channel circuit 118 and the microcontroller 124.

The microcontroller 124 controls the DDC 120 in response to a read/write command and further controls track seeking or track following. A programmable read-only memory (PROM) 126 stores programs and various set values for running the microcontroller 124. A servo driving unit 128 generates a driving current for driving the VCA 130 and applies the driving current to a voice coil of the VCA 130 in response to a signal controlling location of the heads 112 generated by the microcontroller 124. The VCA 130 moves the heads 112 on the discs 110 in accordance with the direction and amount of the driving current received from the servo driving unit 128. When the microcontroller 124 transmits a value for controlling rotation of the discs 110 to a spindle motor driving unit 132, the spindle motor driving unit 132 drives the spindle motor 134 to rotate the disc 110. Under the control of the microcontroller 124, a disc signal controller 136 generates various timing signals for the read/write operation, and decodes servo information and applies a result of decoding to the microcontroller 124.

Figure 2:
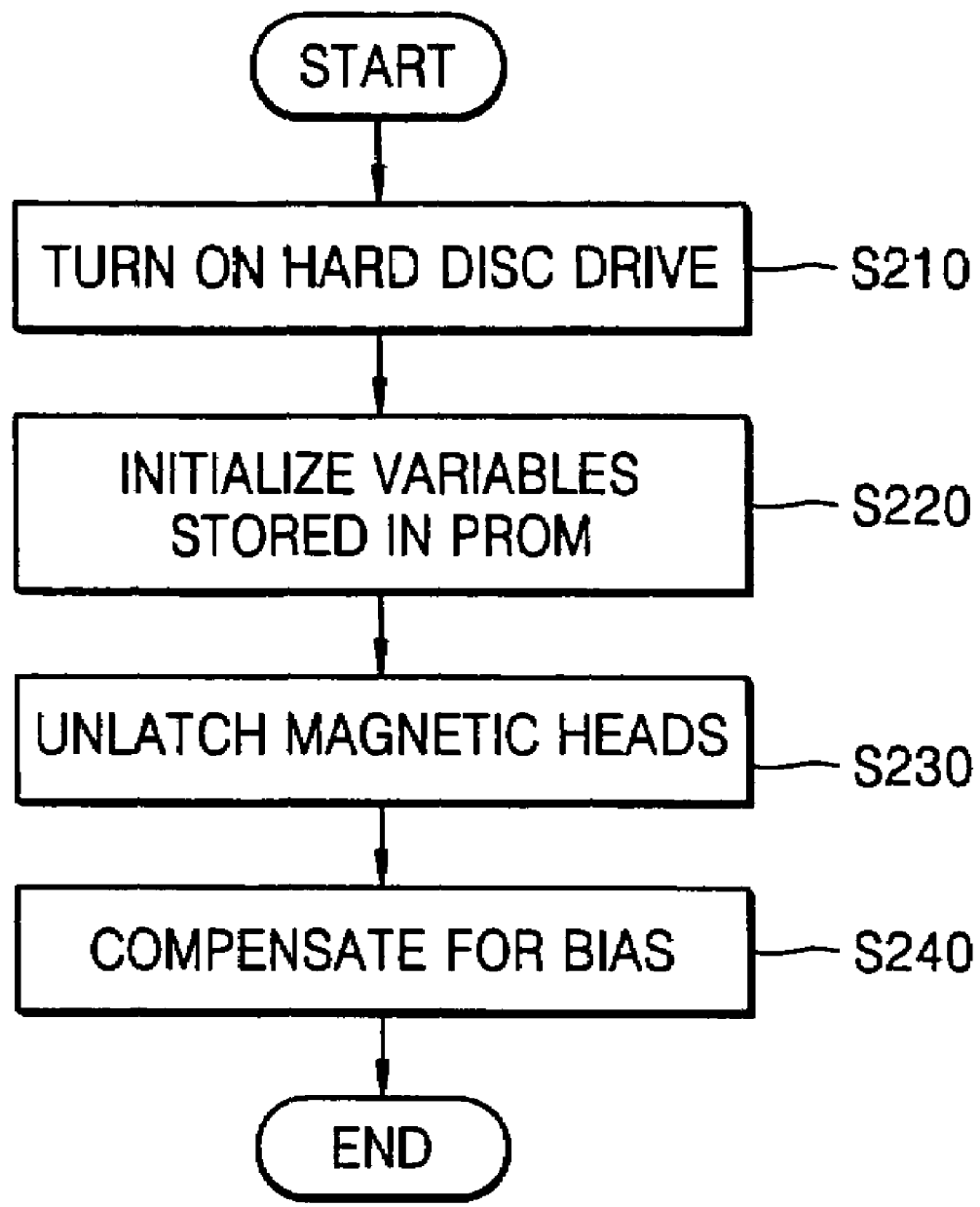
FIG. 2 is a flowchart illustrating conventional bias calibration using the hard disc drive of FIG. 1.

FIG. 2 is a flowchart illustrating conventional bias calibration using the hard disc drive of FIG. 1. Referring to FIG. 2, when the hard disc drive is turned on (operation 210), the microcontroller 124 initializes variables stored in the PROM 126 (operation 220).

Next, the microcontroller 124 transmits a control signal to the servo driving unit 128 and the servo driving unit 128 supplies a current to a voice coil motor (not shown) to drive the actuator 130 to which the heads 112 are connected, thus unlatching the heads 112 (operation 230). Next, bias calibration is performed by measuring a track bias while moving the head 112 on the disc 110 in the outer diameter direction and then moving the head 112 in the inner diameter direction, and calculating bias compensation values corresponding to the measured biases (operation 240).

Figure 3:
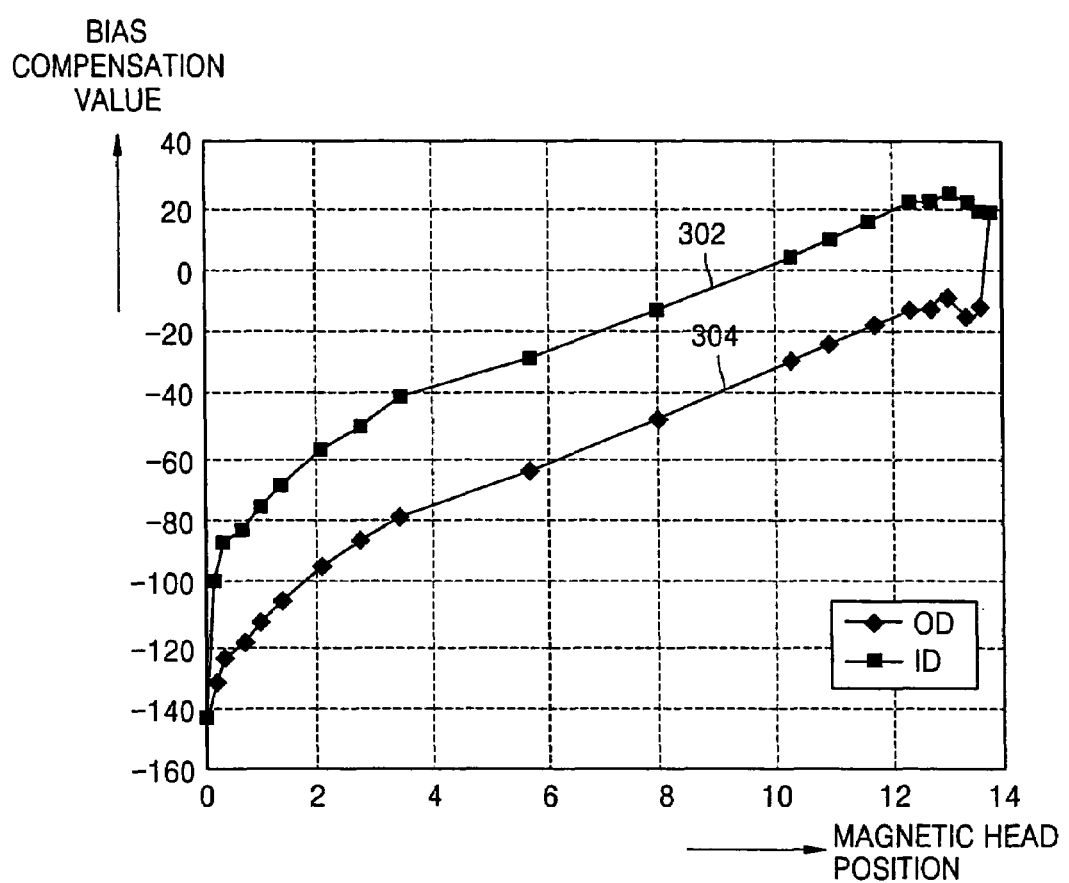
FIG. 3 is an example of a compensation graph obtained by conventional bias calibration of FIG. 2.

FIG. 3 is an example of bias curves obtained by using the conventional bias calibration of FIG. 2. First, bias compensation values are obtained by measuring biases while moving the head 112 over search tracks in the outer diameter direction. Then, bias compensation values are obtained by measuring biases while moving the head 112 in the inner diameter direction. The obtained bias compensation values are then stored in a bias compensation table.

Referring to FIG. 3, the horizontal axis denotes locations of the head 112 on the disc 110 and a vertical axis denotes bias compensation values with respect to the respective head locations. In FIG. 3, an upper curve 302 is a bias compensation curve for the outer diameter direction and a lower curve 304 is a bias compensation curve for the inner diameter direction.

As is apparent from FIG. 3, in the conventional method of compensating for a bias, track selected to measure bias compensation values are not regularly distributed. More specifically, based on statistical observations, a distance between track selected near the innermost and outermost tracks, where track seeking is frequently made, is shorter than a distance between track selected in a middle area of the disc, e.g., between a track 40,000 to a track 100,000.

After the selection, biases are measured while sequentially moving the head 112 over the selected tracks in the outer diameter direction, and bias compensation values are calculated using a result of the measurements. Next, biases are measured while sequentially moving the head 112 over the selected tracks in the inner diameter direction, and bias compensation values are calculated using a result of the measurements. Next, the bias compensation curve 302, which is used for track seeking in the outer diameter direction, and a bias compensation curve 304, which is used for track seeking in the inner diameter direction, are obtained by using the obtained bias compensation values.

The graph of FIG. 3 reveals that an offset between the compensation curve 302 and the compensation curve 304, which are used for long track seeking, is very large.

Accordingly, when short track seeking that requires a reversal in head direction is performed, a bias compensation value is at least as large as the offset. Use of such a bias compensation value causes disturbances in the head 112, thus increasing the time required for track seeking.

It is assumed that track seeking is performed in the inner diameter direction and then in the outer diameter direction. In this case, bias compensation values of the compensation curve 304 are applied to the former case while those of the compensation curve 302 are applied to the latter case. When an offset between the compensation values of the compensation curves 302 and 304 is applied to short track seeking requiring a reversal in head direction, the time required for track seeking is increased. An experiment reveals that a bias changes even in short track seeking without changing the direction of the track seeking. Thus, bias compensation is required for short track seeking that requires a change in the track seeking and short track seeking that does not require a change in the track seeking.

More specifically, the following cases must considered for bias compensation for short track seeking:
(1) when short track seeking is performed in the outer diameter direction after track seeking in the outer diameter direction (OD-after-OD);
(2) when short track seeking is performed in the outer diameter direction after track seeking in the inner diameter direction (OD-after-ID);
(3) when short track seeking is performed in the inner diameter direction after track seeking in the inner diameter direction (ID-after-ID); and
(4) when short track seeking is performed in the inner diameter direction after track seeking in the outer diameter direction (ID-after-OD).

Korean Patent Laid-Open Publication No. 1999-223631, filed in the name of the assignee of the present invention and published Oct. 7, 1999, discloses a method of measuring bias compensation values for short track seeking requiring a reversal in head direction using hysterisis. According to this publication, when short track seeking is performed both in forward and reverse directions and a head moving distance corresponds to a minimum hysterisis distance, an inclination of hysterisis used to compensate for a bias in short track seeking is calculated using bias compensation curves of FIG. 3 and a bias compensation value for a target track is calculated using the inclination of hysterisis. Here, hysterisis is magnetic characteristics of a voice coil, specifically, the phenomenon in which the magnetic induction of a ferromagnetic field lags behind the changing magnetic field. A minimum hysterisis distance indicates a distance corresponding to minimum hysterisis characteristics of the voice coil, i.e., a minimum head moving distance while a change in a direction of magnetization lags behind a change in a direction of currents supplied to the voice coil.

Although the publication teaches a method of easily calculating a bias compensation value for a target track during short track seeking using a simple equation, an exact distance of the target track is not considered and the inclination of hysterisis is calculated using the bias compensation values based on long track seeking. Thus, a variation in a bias according to a head moving distance is not reflected when calculating a bias compensation value. Similarly, U.S. Pat. No. 5,872,674, published on Feb. 16, 1999, discloses a method of compensating for a bias during track seeking.

Further, both the above publication and US patent disclose compensation of a bias only in short track seeking that requires a reversal in direction, e.g., in the outer diameter after in the inner diameter direction, or vice versa. That is, they do not teach compensation for a bias in short track seeking in the same direction.

To solve this problem, the disclosed embodiment of the present invention is a method of compensating for a bias in short track seeking using bias compensation values obtained while moving a magnetic head, thereby enabling precise bias compensation. This method is applicable to both short track seeking requiring a reversal in head direction and short track seeking in only one direction. Also, this method makes it possible to quickly calculate bias compensation values since sub processes of calculating bias compensation values can be continuously performed in accordance with track seeking direction. Further, in this method, during track seeking, a head moving distance in the head forward direction is equivalent to that in the head reverse direction, i.e., the head is symmetrically moved. Therefore, it is possible to calculate more exact bias compensation values.

Figure 4A:
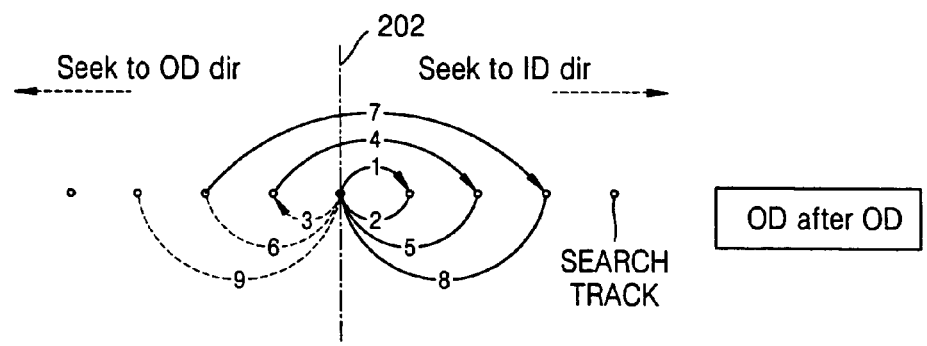
FIGS. 4A through 4D illustrate methods of moving magnetic heads and measuring bias compensation values according to embodiments of the present invention.
Figure 4B:
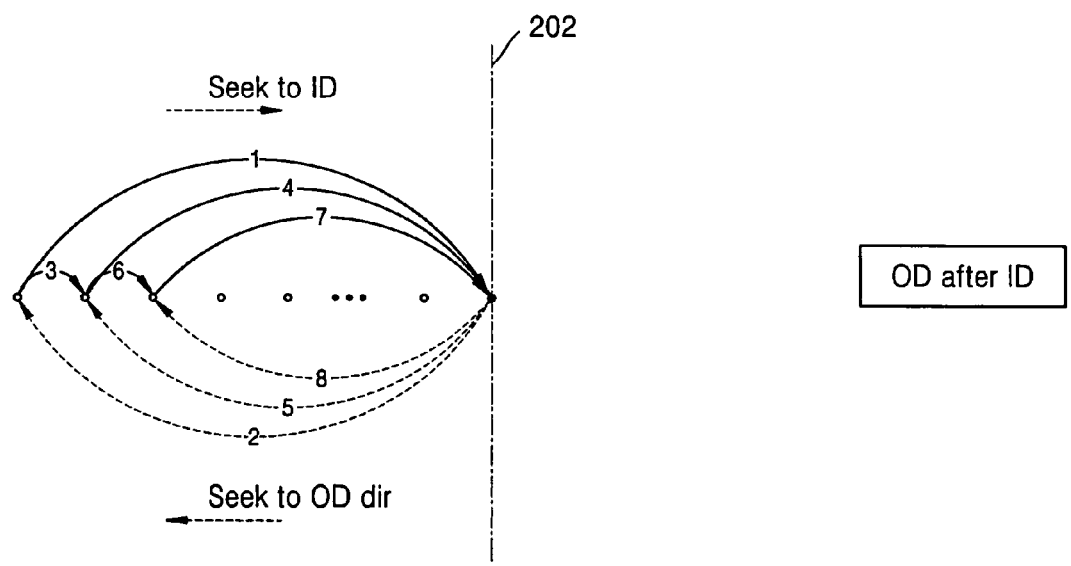
Figure 4C:
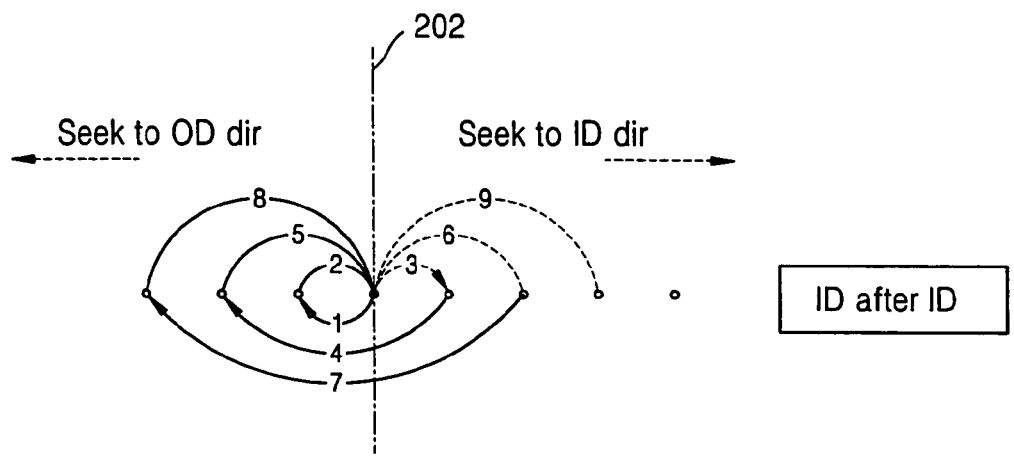
Figure 4D:
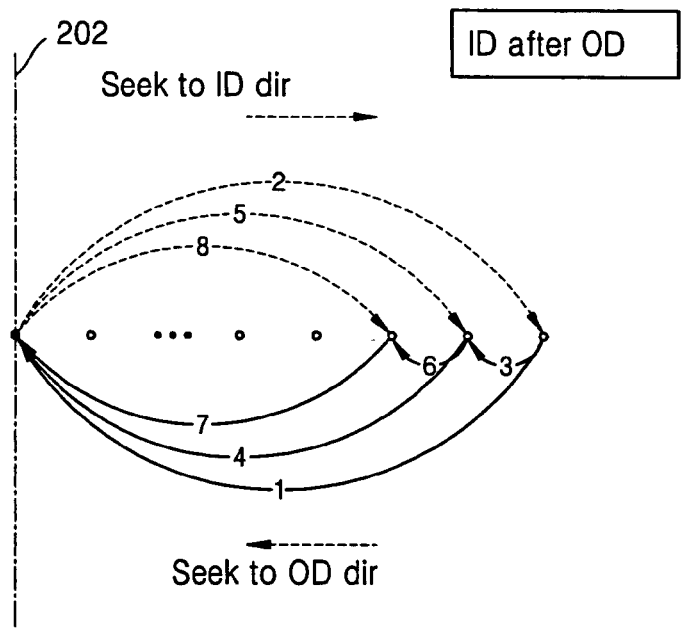

FIGS. 4A through 4D are diagrams illustrating methods of moving a magnetic head and calculating bias compensation values to compensate for a bias in short track seeking according to an embodiment of the present invention. FIG. 4A illustrates a method of moving the head to obtain bias compensation curves when performing short track seeking in the outer diameter direction after track seeking in the outer diameter direction (OD-after-OD). FIG. 4B illustrates a method of moving the head to obtain compensation curves when performing short track seeking in the outer diameter direction after track seeking in the inner diameter direction (OD-after-ID). FIG. 4C illustrates a method of moving the head to obtain compensation curves when performing short track seeking in the inner diameter direction after track seeking in the inner diameter direction (ID-after-ID). FIG. 4D illustrates a method of moving the head to obtain compensation curves when performing short track seeking in the inner diameter direction after track seeking in the outer diameter direction (ID-after-OD).

In FIGS. 4A through 4D, a dotted line 202 indicates that starting points of track seeking performed to obtain respective compensation curves are the same. That is, the methods of FIGS. 4A through 4D use the same reference track as a starting point. A region of the diagram of each of FIGS. 4A through 4D to the left of the dotted line 202 indicates tracks closer to the outermost track (i.e., in the outer direction (OD)) and a region to the right of the dotted line 202 indicates tracks closer to the innermost track (in the inner direction (ID)). Arrows 1 through 9 in each of FIGS. 4A through 4D denote a sequence of track seeking.

Methods of producing a compensation curve will now be described with reference to FIGS. 4A through 4D. First, a reference track and search tracks, on which track seeking will be performed, are selected. The reference track is a reference point from which a magnetic head is moved to a destination track when calculating bias compensation values for short track seeking according to the present embodiment. The reference track is located between the innermost track and the outermost track. The search tracks are spaced a predetermined distance from the reference track. According to an embodiment of the present invention, the search tracks are disposed at multiples of 100 tracks from the reference track.

A total number of the search tracks should be sufficient to cover a range of short track seeking. For example, assuming that the range of short track seeking corresponds to 1,000 tracks and a minimum distance between adjacent search tracks corresponds to 100 tracks, there are ten search tracks in each direction from the base track to the innermost track and the direction from the reference track to the outermost track.

Compensation curves are obtainable according to one of the following processes:

(i) Method of calculating the compensation curve when short track seeking is in the performed in the outer diameter direction after track seeking in the outer diameter direction (OD-after-OD):

Short track seeking is performed as shown in FIG. 4A. First, short track seeking is performed in the direction from the reference track to the outermost track as indicated by the arrow 2, and then repeating short track seeking once more in the direction as indicated by the arrow 3. Bias compensation values are calculated during track seeking in the direction of the arrow 3. In this case, the bias compensation values are calculated by performing track seeking at 100 track intervals.

Similarly, bias compensation values are calculated by performing track seeking at 200 track intervals as indicated by the arrows 5 and 6, and then calculated by performing track seeking at 300 track intervals as indicated by the arrows 8 and 9. Such a process is repeated until track seeking is performed for an interval of 1,000 tracks, i.e., up to the maximum number of tracks within the range of short track seeking.

The bias compensation values obtained by performing short track seeking with a 100 track interval, a 200 track interval, . . . , and a 1000 track interval are stored in a table, and a compensation curve to be used when performing short track seeking in the direction from the reference track to the outermost track and repeating short track seeking in the same direction is obtained using the stored bias compensation values. The bias compensation curve corresponds to a graph 502 of FIG. 5.

(ii) Method of calculating the compensation curve when short track seeking is performed in the outer diameter after track seeking in the inner diameter direction (OD-after-ID): Short track seeking as shown in FIG. 4B. First, short track seeking is performed in the direction from the reference track to the innermost track as indicated by the arrow 1, and then in the direction to the outermost track as indicated by the arrow 2. Bias compensation values are calculated during track seeking in the direction of the arrow 2. That is, bias compensation values are calculated by performing track seeking at 100 track intervals.

Similarly, bias compensation values are calculated by performing track seeking at 900 track intervals as indicated by the arrows 4 and 5, and calculated by performing track seeking at 800 track intervals as indicated by the arrows 7 and 8. Such a process is repeated until track seeking is performed on 100 tracks, i.e., down to the minimum number of tracks within the range of short track seeking.

The bias compensation values obtained by performing short track seeking with intervals of 1000 tracks, 900 tracks, . . . , and 100 tracks are stored in the table, and a compensation curve to be used when performing short track seeking in the direction from the reference track to the outermost track and then in the direction from the reference track to the innermost track is obtained using the stored bias compensation values. The bias compensation curve corresponds to a graph 508 of FIG. 5.

(iii) Method of calculating the compensation curve when short track seeking is performed in the inner diameter direction after track seeking in the inner diameter direction (ID-after-ID): Short track seeking is performable as shown in FIG. 4C. First, short track seeking is performed in the direction from the reference track to the innermost track as indicated by the arrow 2, and performed once more in the same direction as indicated by the arrow 3. Bias compensation values are calculated during track seeking in the direction of the arrow 3. That is, bias compensation values are calculated by performing track seeking at 100 track intervals.

Similarly, bias compensation values are calculated by performing track seeking at 200 track intervals as indicated by the arrows 5 and 6, and calculated by performing track seeking at 300 track intervals as indicated by the arrows 8 and 9. Such a process is repeated until track seeking is performed for an interval of 1000 tracks, i.e., up to the maximum number of intervals of tracks within the range of short track seeking.

The bias compensation values obtained by performing short track seeking at intervals of 100 tracks, 200 tracks, . . . , and 1000 tracks are stored in the table, and a compensation curve to be used when performing short track seeking from the reference track to the outermost track and repeating short track seeking in the same direction is obtained using the stored bias compensation values. The bias compensation curve corresponds to a graph 504 of FIG. 5.

(iv) Method of calculating the compensation curve when short track seeking is performed in the inner diameter direction after track seeking in the outer diameter direction (ID-after-OD): In this case, short track seeking is performable as shown in FIG. 4D. First, short track seeking is performed in the direction from the reference track to the outermost track as indicated by the arrow 1, and then in the direction to the innermost track as indicated by the arrow 2. Bias compensation values are calculated during track seeking in the direction of the arrow 2. That is, bias compensation values are calculated by performing track seeking at a 1000 track interval.

Similarly, bias compensation values are calculated by performing track seeking at 900 track intervals as indicated by the arrows 4 and 5, and calculated by performing track seeking at 800 track intervals as indicated by the arrows 7 and 8. Such a process is repeated until track seeking is performed at an interval of 100 tracks, i.e., down to the minimum number of tracks within the range of short track seeking.

The bias compensation values obtained by performing short track seeking at intervals of 1000 tracks, 900 tracks, . . . , and 100 tracks are stored in the table, and a compensation curve to be used when performing short track seeking in the direction from the reference track to the outermost track and then from the reference track to the innermost track is obtained using the stored bias compensation values. The bias compensation curve corresponds to a graph 504 of FIG. 5.

Referring to FIGS. 4A through 4D, a start point and end point of track seeking are equivalent to each other. For instance, the outermost track of the search tracks becomes an end point of track seeking performed in the direction from the reference track to the outermost track and then in the direction from the reference track to the outermost track as shown in FIG. 4A. The outermost track of the search tracks becomes a start point of track seeking performed in the direction from the reference track to the innermost track and then in the direction from the reference track to the outermost track as shown in FIG. 4B.

Accordingly, it is possible to successively complete track seeking in various directions without a pause by equating the start and end points of track seeking, thereby reducing the time required to make a compensation table.

When calculating bias compensation values for the track seeking illustrated by FIGS. 4A through 4D, biases are measured starting from the reference track. Referring to FIG. 4A, it is assumed that track seeking is performed in the direction from the reference track to the outermost track and performed once more in the same direction, that is, track seeking is performed as indicated by the arrows 3, 6, and 9. In this case, track seeking starts from the reference track. Since bias compensation values are calculated by initiating track seeking from the reference track, it is possible to consistently accomplish the calculation, thus increasing reliability of the bias compensation values.

Accordingly, as described with reference to FIGS. 4A through 4D, it is possible to exactly and quickly obtain a bias compensation value for short track seeking using a method of calculating a bias compensation value for short track seeking according to the present invention.

Meanwhile, a head moving distance before the track seeking illustrated by FIGS. 4A through 4D for calculation of bias compensation values is equivalent to a head moving distance after track seeking. For instance, a head moving distance of track seeking as indicated by the arrow 2 of FIG. 4A, i.e., before calculating the bias compensation values, is equivalent to that of track seeking as indicated by the arrow 3 after the bias compensation values are calculated. This is also applicable to FIGS. 4B through 4D.

Figure 5:
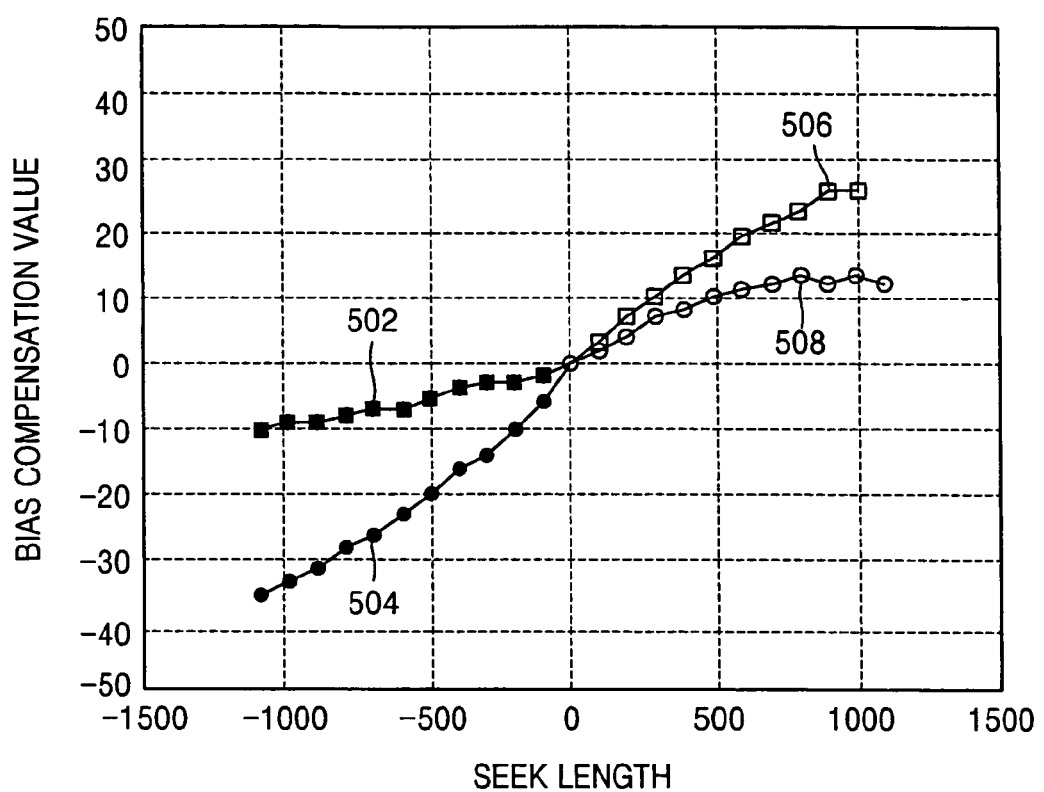
FIG. 5 is an example of bias compensation curves obtained by bias calibration according to an embodiment of the present invention.

FIG. 5 is a graph illustrating bias compensation curves obtained by measuring biases according to an embodiment of the present invention. In FIG. 5, the vertical axis indicates bias compensation values and a horizontal axis indicates head moving positions expressed in units of tracks. The bias compensation curves of FIG. 5 are obtained by measuring biases generated during track seeking of a disc with 130K tracks per inch (TPI).

Figure 6:
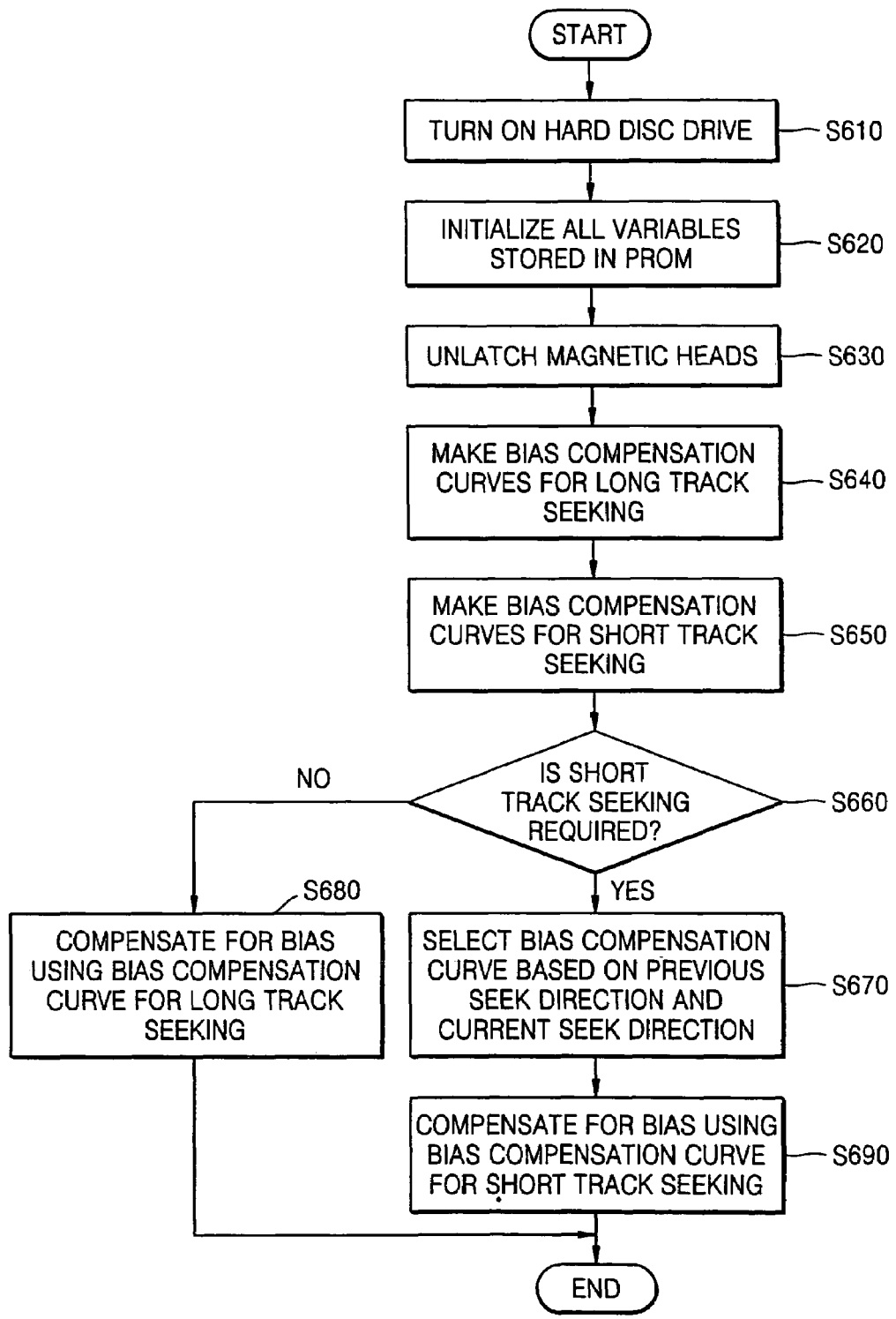
FIG. 6 is a flow chart illustrating a method of compensating for biases during track seeking according to an embodiment of the present invention.

FIG. 6 is a flowchart illustrating a method of compensating for biases during track seeking according to an embodiment of the present invention. The method of FIG. 6 compensate for biases by selectively using bias compensation values for long track seeking, such as, for example, those explained with respect to the conventional method of FIG. 2, and bias compensation values for short track seeking, explained with respect to FIGS. 4A through 4D.

Figure 7:
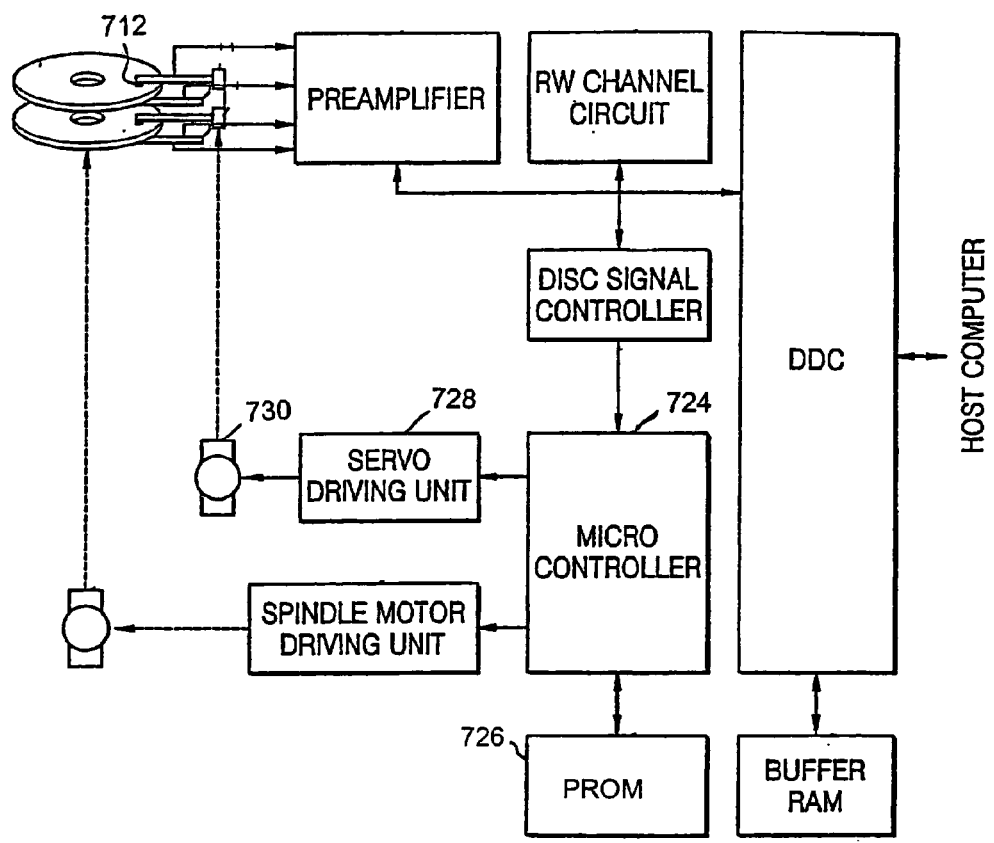
FIG. 7 is a block diagram of a hard disk drive to which the method illustrated by FIG. 6 is applicable.

Referring to FIGS. 6 and 7, when a hard disc drive is turned on (S610), the micro controller 724 initializes all variables stored in the PROM 726 (S620).

Next, the micro controller 724 transmits a control signal to the servo driving unit 128 and the servo driving unit 728 performs an unlatching operation by supplying a current to a voice coil motor (not shown) that drives the VCA 730 connected to the magnetic heads 712 (S630). Next, biases on tracks are measured while moving the magnetic heads 112 in the direction from an innermost track to an outermost track, biases are measured while moving the magnetic heads 112 in the inner diameter direction, bias compensation values corresponding to the measured biases are calculated, and bias compensation curves to be used for long track seeking, shown in FIG. 3, are generated using the calculated bias compensation values (S640).

Next, biases are measured while moving the magnetic heads 712 in the direction from a reference track to the outermost track (or the innermost track) as illustrated in FIGS. 4A through 4D, bias compensation values corresponding to the measured biases are calculated, and then, bias compensation curves for short track seeking, shown in FIG. 5, are generated using the bias compensation values (S650).

Next, prior to track seeking, whether short track seeking or long track seeking is required is determined (S660). The requirement for short track seeking or long track seeking is determined by the distance between search tracks and the reference track. In the present embodiment, if the distance corresponds to less than 1000 tracks, it is determined that short track seeking will be performed. In other words, when a head moving distance is less than 1000 tracks, it is determined that short track seeking will be performed and biases are compensated for using a bias compensation table for short track seeking (S670 and S690). Otherwise, biases are compensated for using a bias compensation table for long track seeking (S680).

When it is determined in operation 660 that short track seeking is required, a direction of moving the magnetic heads 712 is determined and a bias compensation curve is selected based on previous and current seek directions (S670).

More specifically, in operation S670, selection of bias compensation curve is as follows:

(a) The bias compensation curve 502 of FIG. 5 is used to perform short track seeking in the outer diameter direction after track seeking in the outer diameter direction (OD-after-OD);

(b) the bias compensation curve 508 is used to perform short track seeking in the outer diameter direction after track seeking in the inner diameter direction (OD-after-ID);

(c) the bias compensation curve 506 is used to perform short track seeking in the inner diameter direction after track seeking in the inner diameter direction (ID-after-ID); or (d) the bias compensation curve 504 is used to perform short track seeking in the inner diameter direction after track seeking in the outer diameter direction (ID-after-OD).

Upon selecting an appropriate bias compensation curve, biases generated by short track seeking are compensated for using the same.

As described above according to embodiments of the present invention, there are methods of exactly and quickly measuring bias compensation values for short track seeking, and exactly compensating for a bias using an appropriate compensation table selected depending on whether short track seeking or long track seeking is required.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of calculating bias compensation values for track seeking, comprising:

setting a reference track, and search tracks disposed between the reference track and an innermost track and between the reference track and an outermost track;

calculating bias compensation values usable for compensating for biases operating on a magnetic head while moving the magnetic head in a direction from the reference track to one of the outermost track and to the innermost track, and then in a direction from the reference track to the other of the one of the innermost track and the outermost track; and making bias compensation curves according to head moving distances using the calculated bias compensation values.

2. The method of claim 1, wherein the distances between adjacent search tracks are uniform.

3. The method of claim 2, wherein the search tracks are deposed within less than 1000 tracks from the reference track.

4. The method of claim 1, wherein the calculating includes:
moving the magnetic head from the reference track toward the innermost track and then calculating the bias compensation values while moving the magnetic head toward the innermost track; and
moving the magnetic head from the reference track toward the outermost track and then calculating the bias compensation values while moving the magnetic head toward the outermost track.

5. The method of claim 1, wherein the calculating includes:
moving the magnetic head from the reference track toward the innermost track and then calculating the bias compensation values while moving the magnetic head toward the outermost track; and
moving the magnetic head from the reference track toward the outermost track and then calculating the bias compensation values while moving the magnetic head toward the innermost track.

6. The method of claim 1, wherein the calculating includes:
moving the magnetic head from the reference track toward the innermost track and then calculating the bias compensation values while moving the magnetic head toward the innermost track;
moving the magnetic head from the reference track toward the outermost track and then calculating the bias compensation values while moving the magnetic head toward the outermost track;
moving the magnetic head from the reference track toward the innermost track and then calculating the bias compensation values while moving the magnetic head toward the outermost track; and
moving the magnetic head from the reference track toward the outermost track and then calculating the bias compensation values while moving the magnetic head toward the innermost track.

7. The method of claim 6, wherein a magnetic head moving distance before calculating the bias compensation values is equivalent to a magnetic head moving distance for calculating the bias compensation values.

8. The method of claim 1, wherein track seeking is performed in a hard disc drive and using a head moving distance.

9. The method of claim 1, wherein the reference track is between the innermost track and the outermost track.

10. The method of claim 1, wherein the innermost track and the outermost track once search tracks, and these search tracks are spaced a specified distance from the reference track.

11. The method of claim 10, wherein the specified distance is 100 tracks.

12. The method of claim 1, wherein the innermost track and the outermost track are search tracks, and the calculating is repeated for multiple search tracks.

13. The method of claim 12, wherein the number of search tracks are sufficient to cover a range of short track seeking.

14. The method of claim 13, wherein the number of search tracks is 20.

15. The method of claim 13, wherein there are 10 innermost search tracks and 10 outermost tracks.

16. A method of compensating for a bias generated when performing track seeking of a hard disc drive, using a head moving distance, comprising:
setting a reference track, and search tracks disposed within a specified range from a track between the reference track and an innermost track to a track between the reference track and an outermost track;
calculating bias compensation values usable to compensate for biases operating on a magnetic head while moving the magnetic head in the direction from the reference track to one of the outermost track and the innermost track and then in the direction from the reference track to the other of one of the innermost track and the outermost track;
making bias compensation curves according to head moving distances using the calculated bias compensation values;
determining whether a head moving distance when performing track seeking by moving the magnetic head is within the specified range; and
compensating for biases using the bias compensation curves when the head moving distance is within the specified range.

17. A hard disk drive which calculates bias compensation values for track seeking, comprising a controller which:
sets a reference track, and search tracks disposed between the reference track and an innermost track and between the reference track and an outermost track;
calculates bias compensation values usable for compensating for biases operating on a magnetic head while moving the magnetic head in a direction from the reference track to one of the outermost track and to the innermost track, and then in a direction from the reference track to the other of the one of the innermost track and the outermost track; and
calculates bias compensation curves according to head moving distances using the calculated bias compensation values.

18. The apparatus of claim 17, wherein the distances between adjacent search tracks are uniform.

19. The apparatus of claim 18, wherein the search tracks are deposed within less than 1000 tracks from the reference track.

20. The apparatus of claim 17, wherein the controller calculates bias compensation values by:
moving the magnetic head from the reference track toward the innermost track and then calculating the bias compensation values while moving the magnetic head toward the innermost track; and
moving the magnetic head from the reference track toward the outermost track and then calculating the bias compensation values while moving the magnetic head toward the outermost track.

21. The apparatus of claim 17, wherein the controller calculates bias compensation values by:
    moving the magnetic head from the reference track toward the innermost track and then calculating the bias compensation values while moving the magnetic head toward the outermost track; and
    moving the magnetic head from the reference track toward the outermost track and then calculating the bias compensation values while moving the magnetic head toward the innermost track.

22. The apparatus of claim 17, wherein the controller calculates bias compensation values by:
    moving the magnetic head from the reference track toward the outermost track and then calculating the bias compensation values while moving the magnetic head toward the outermost track;
    moving the magnetic head from the reference track toward the innermost track and then calculating the bias compensation values while moving the magnetic head toward the outermost track; and
    moving the magnetic head from the reference track toward the outermost track and then calculating the bias compensation values while moving the magnetic head toward the innermost track.

23. A hard disk drive which compensates for a bias generated when performing track seeking, comprising a controller which:
    sets a reference track, and search tracks disposed between the reference track and an innermost track and between the reference track and an outermost track;
    calculates bias compensation values usable for compensating for biases operating on a magnetic head while moving the magnetic head in a direction from the reference track to one of the outermost track and to the innermost track, and then in a direction from the reference track to the other of the one of the innermost track and the outermost track;
    calculates bias compensation curves according to head moving distances using the calculated bias compensation values;
    determines whether a head moving distance when performing track seeking by moving the magnetic head is within the specified range; and
    compensates for biases using the bias compensation curves when the head moving distance is within the specified range.

* * * * *